(No Model.) 3 Sheets—Sheet 1.

S. L. ALLEN.
DISTRIBUTER FOR FERTILIZERS OR SEEDS.

No. 582,610. Patented May 18, 1897.

Witnesses:

Inventor:
Samuel L. Allen
by his Attorney, (No Model.) 3 Sheets—Sheet 3.

S. L. ALLEN.
DISTRIBUTER FOR FERTILIZERS OR SEEDS.

No. 582,610. Patented May 18, 1897.

Witnesses:
Jno E Parker
B. W. Peoples.

Inventor:
Samuel L. Allen,
by his Attorney

UNITED STATES PATENT OFFICE.

SAMUEL L. ALLEN, OF MOORESTOWN, NEW JERSEY.

DISTRIBUTER FOR FERTILIZERS OR SEEDS.

SPECIFICATION forming part of Letters Patent No. 582,610, dated May 18, 1897.

Application filed July 8, 1896. Serial No. 598,380. (No model.)

*To all whom it may concern:*

Be it known that I, SAMUEL L. ALLEN, a citizen of the United States, and a resident of Moorestown, Burlington county, State of New Jersey, have invented a certain new and useful Improvement in Distributers for Fertilizers or Seeds, of which the following is a full, clear, and exact description, reference being had to the accompanying drawings, forming part of this specification.

My invention relates to certain improvements in that class of machines employed to distribute fertilizers or seeds, &c., in a predetermined quantity in hills or in a continuous stream along the furrow or row, and has for its object to provide a machine of this character in which the amount or quantity of fertilizer or seed to be dropped may be regulated to a nicety and its delivery be absolute and positive, while at the same time all danger of clogging or choking of the distributing devices is avoided.

The further object of my invention is to improve, simplify, and cheapen the construction of such devices and to provide for the adjustment of its various parts in accordance with the character of the work to be performed, as more fully set forth hereinafter.

Figure 1:
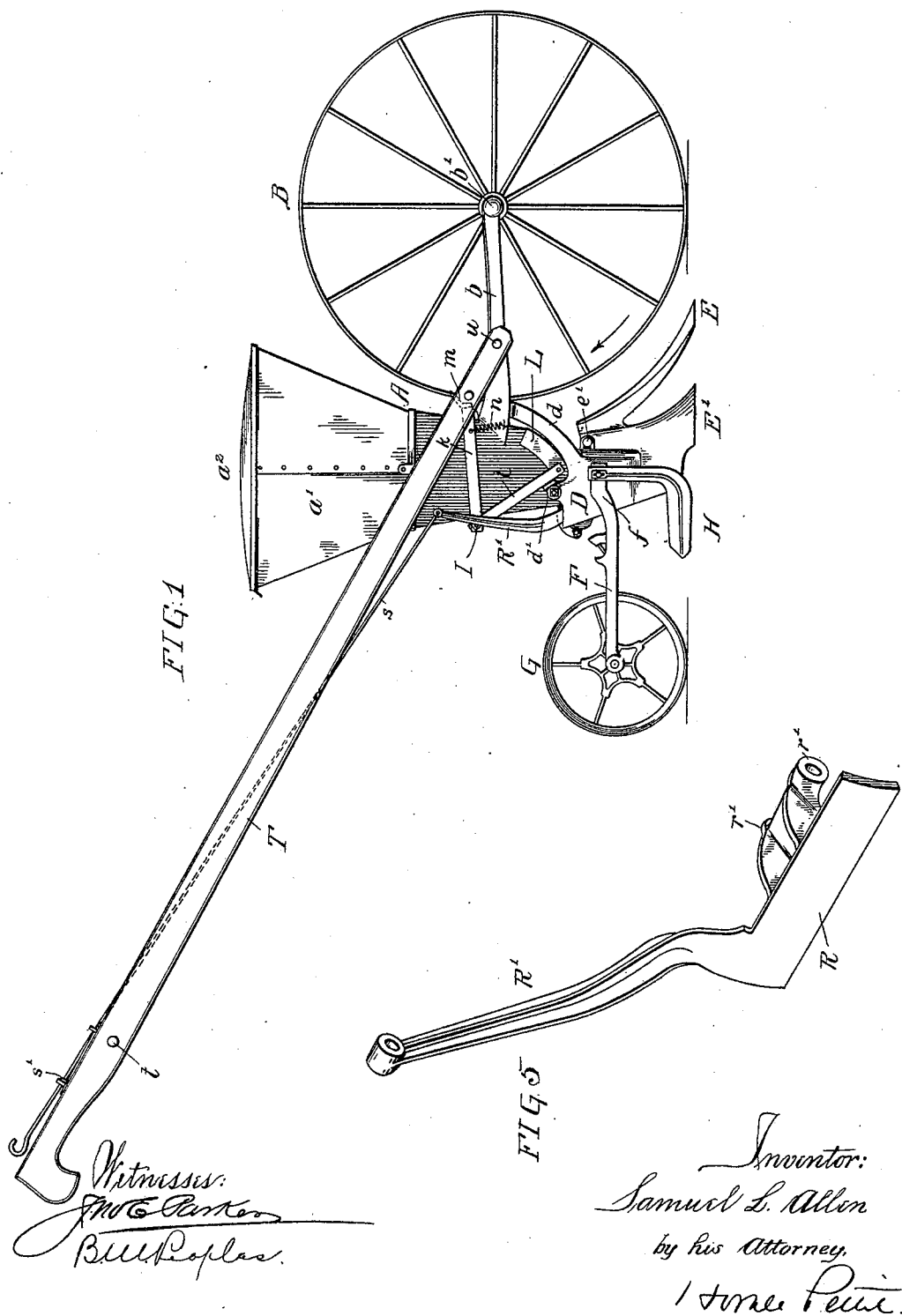
Figure 2:
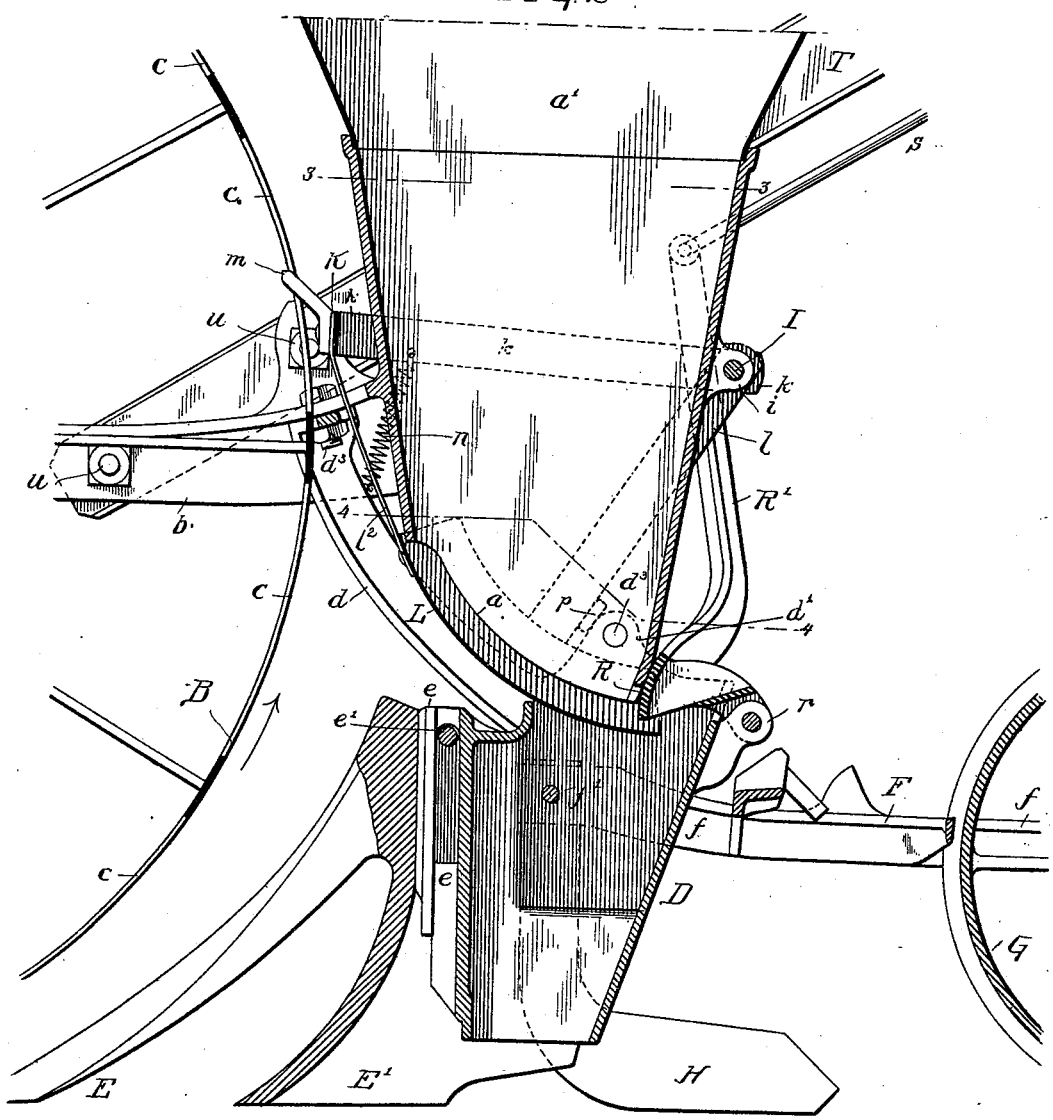
Figure 3:
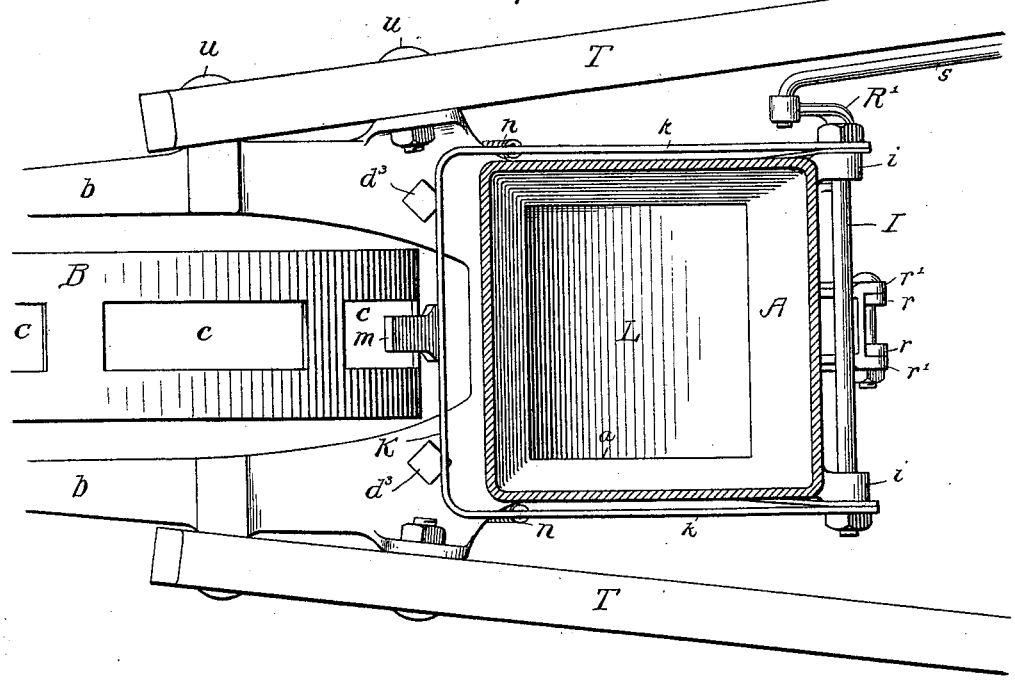
Figure 4:
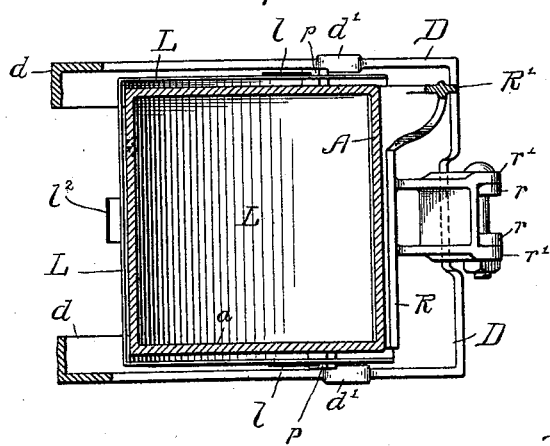

In the accompanying drawings, Figure 1 is a side elevation of a distributing device constructed in accordance with my invention. Fig. 2 is a longitudinal sectional elevation through the center of the machine and drawn to an enlarged scale. Figs. 3 and 4 are sectional plan views on the lines 3 3 4 4, respectively, of Fig. 2; and Fig. 5 is an enlarged detached perspective view of the distributer-valve.

Referring to the drawings, A represents the hopper of the machine, preferably rectangular in form in cross-section and gradually tapering from its upper to its lower end, terminating at the lower end in a rounded open bottom $a$. The main body of the hopper is preferably formed of cast metal, and above the cast-metal portion is mounted a sheet-metal portion $a'$, flaring toward its open top, which when in use is covered by a hinged lid $a^2$.

Secured to or formed integral with the main body of the hopper are two arms $b$, between the outer ends of which is secured a shaft or bolt $b'$ for a supporting-wheel B. The rim of the wheel B is formed of a band of suitable metal, in which are formed a series of openings $c$ of equal length and at equidistant intervals throughout the rim.

At a point immediately below the open mouth of the hopper A is hung a tapering guiding-box D, provided with arms $d$ and ears $d'$, which are secured by bolts $d^3$ to the arms $b$ and the hopper A, respectively. This box D is so arranged that the seed or fertilizer from the hopper A will be guided to a point very near the ground, and all danger of its being scattered will be avoided.

On the front face of the box D is a slotted guide $e$, on which is placed a furrowing-tooth E and plow-point E', preferably formed in a single casting and secured in position by a bolt $e'$ passing through the slotted guide $e$, so that its vertical height may be adjusted to form a furrow of any desired depth. On the side walls of the box D are secured the opposite arms $f$ of the frame F, carrying at its rear end a supporting-wheel G, the rim of which is concave, so as to leave the ground in a rounded form over the seed.

The arms $f$ are secured in position by a bolt $f'$ passing entirely through the box D, and also serving to secure in position two covering-blades H, which may be adjusted as regards their vertical height.

On the rear face of the hopper A are formed two lugs $i$, in which is supported a bolt I, serving as a rock-shaft, and secured to this bolt are the two arms $k$ of a ∪-shaped strip K and two arms $l$, the latter carrying at their lower ends a curved shutter L, formed of a flanged piece of sheet metal extending under the open bottom $a$ of the hopper and entirely covering the same save at the lower rear end of the hopper, where the discharge-mouth for the contents of the hopper is situated, the curvature or inclination of the bottom being such that the material in the hopper will flow naturally toward the discharge-mouth. The ∪-shaped strip K extends around the front and sides of the hopper, and at its central front end is secured a projecting finger $m$, which projects into the path of the rim of the wheel B in such manner that it will extend within the openings $c$ in the periphery of the wheel, and as the wheel revolves the body of the rim between the openings will engage with said finger and move the same vertically. The central front end of the strip K is united to the upper end of the bottom piece L through the medium of the strip l², so that the bottom piece, the strip K, and the levers l form, to all intents and purposes, a solid structure or frame which must move each time the finger m is actuated by contact with the rim of the wheel B. This frame is held in its normal position, as illustrated in Fig. 2, by means of coiled tension-springs n, connecting the arms k to the arms b, the limit of downward movement being regulated by a positive stop p, provided on the sides of the hopper and with which the arms l come into contact.

On the rear of the box D are formed lugs r, to which are pivoted similar lugs r' on a structure comprising a curved plate R and a lever R', the curved plate R being situated directly to the rear of the discharge-mouth of the hopper and in close contact with the rear face of the hopper, so that as said plate is raised or lowered the area of the discharge-mouth may be increased or diminished to any desired extent and the quantity of material discharged be regulated or the mouth entirely closed.

The arm R' is connected to a rod s, which extends up to the outer end of one of the handles T of the machine, being provided at or near its upper end with an adjusting-nut s', by means of which it may be moved longitudinally to regulate the valve-plate R, and so adjust the area of the discharge-opening of the hopper.

The handles T are connected near their upper ends by a suitable cross-bar t and at their lower ends are secured by bolts u to the arms b.

In operation as the machine is propelled or pushed forward, the wheel B being revolved in the direction of the arrow, and as the lower edge of each of the openings c comes into contact with the ear M the latter will be raised and with it the lower bottom plate L, the latter being moved slightly to the front on a curved line until the small section of rim intervening between the two adjacent openings c is passed, when the finger m, being instantly released, is permitted to reassume its initial position, which action takes place instantly under the action of the springs n, and the bottom plate is returned to its initial position with a rapid movement, which is suddenly checked by the contact of the arms l with the stops p, causing the fertilizer or seed on the bottom plate to be thrown to the rear and projected through the opening at the lower rear end of the hopper, from whence it falls through the box D into the furrow formed by the furrowing-point E and plow-point E' and is then covered by the blades H and rolled by the wheel G. This action takes place at regular predetermined intervals, which are governed by the number of openings c formed in the rim of the wheel B, and the quantity of material so deposited is regulated, as previously described, by the valve R, while all danger of clogging or choking of the material in the bottom of the hopper is absolutely prevented by the constant jarring and constant movement of the entire bottom of the hopper.

It will of course be understood that various modifications of the structure herein described may be made without departing from the spirit of my invention—as, for instance, the wheel B may be provided with cams of any desired construction instead of the openings c and may, if desired, be so arranged to effect the positive movement of the bottom of the hopper in both directions in lieu of depending on the springs for the return movement, as above described.

If necessary, the adjustment of the valve-plate R may be regulated by means of a screw or otherwise directly at the rear of the hopper in lieu of the handle-rod, as described, or the said valve-plate may be mounted in vertical guides at the rear of the hopper and adjustable on a vertical line, as will be readily understood.

Having thus described my invention, what I claim, and desire to secure by Letters Patent, is—

1. The combination of the hopper having a lower discharge-mouth, a valve for regulating the area of said mouth, a bottom piece for said hopper and means for actuating said bottom piece to effect the discharge of the material through said discharge-mouth, substantially as specified.

2. The combination of the hopper having a lower discharge-mouth, a bottom piece for said hopper, means for reciprocating said bottom piece, and for suddenly arresting the rearward movement of said bottom piece in such manner that a portion of the material carried thereby will be projected through the discharge-mouth.

3. The combination of the hopper having a lower rear discharge-mouth, a reciprocating bottom piece for said hopper and a positive stop mechanism provided within the line of travel of the bottom piece at a point before said bottom piece reaches the otherwise normal limit of rearward travel to suddenly arrest and jar the bottom piece and to give impetus to the discharge, substantially as described.

4. The combination of the hopper having a lower rear discharge-mouth, a bottom piece for said hopper, means for positively moving said bottom piece in one direction, a spring adapted to move said bottom piece rearwardly in the opposite direction, and means for suddenly arresting the rearward movement of the bottom piece before the retractive force of the spring is exhausted, substantially as described.

5. The combination of the seed or fertilizer distributer, a hopper, a reciprocating shutter at the bottom of said hopper and a wheel provided with a series of openings in its rim for effecting the reciprocation of the shutter through the medium of a connecting-arm, substantially as described.

6. The combination of the hopper having a lower rear discharge-mouth, a movable bottom-piece arranged below and forming a support for the contents of the hopper, an adjustable valve for regulating the quantity of the discharge, and mechanism for effecting the movement of said bottom piece.

7. The combination of the hopper having a lower open bottom, a rear discharge-mouth, a curved bottom plate pivoted to the frame and arranged to reciprocate on a curved line under the open bottom of the hopper, mechanism for reciprocating said bottom plate and a valve for regulating the area of the discharge-mouth.

8. The combination of the hopper having an open bottom and a lower rear discharge-mouth, a curved bottom plate pivoted to the frame and arranged to reciprocate under the bottom of the hopper, a lever connected to said bottom plate, a tongue on said lever, mechanism for elevating said tongue at predetermined intervals, and a spring for returning said lever to its initial position.

9. The combination of the hopper having an open bottom and a lower rear discharge-mouth, a curved bottom plate pivoted to the frame and arranged to reciprocate under the bottom of the hopper, a lever connected to said bottom plate, a tongue on said lever, an operating-wheel having a rim provided with a series of openings adapted to be entered successively by said tongue, and a spring for returning said lever to its initial position.

10. The combination of the hopper having a lower open mouth, a rear discharge-mouth, a curved bottom plate pivoted to the frame and arranged to reciprocate on a curved line under the open bottom of the hopper, levers, $l$, carrying said plate, a pivot-bar, I, carrying said levers, a U-shaped strip, K, secured to said bar, I, a finger, $m$, on said U-shaped strip, an operating-wheel, B, for elevating said tongue, springs, $n$, for returning the parts to the initial position and stops, $p$, for limiting the movement of the parts, substantially as specified.

11. The combination of the hopper having an open bottom and a lower rear discharge-mouth, a curved bottom plate, L, a pivot-bar, I, arms extending from said pivot-bar to the bottom plate, a U-shaped strip, K, having its ends secured to said pivot-bar, a strip, $l^2$, uniting said strip, K, to the bottom plate, stops, $p$, on the hopper for engaging the arms, $l$, springs, $n$, extending between the strip, K, and a fixed point, a tongue, $m$, on the strip, K, and means for elevating said tongue, substantially as specified.

12. The combination of the hopper having an open bottom and a lower rear discharge-mouth, a curved bottom plate, L, means for actuating the same to effect the discharge of the contents of the hopper, and a guiding-box provided below the hopper and adapted to receive and guide the material discharged, substantially as specified.

13. The combination of the hopper having an open bottom and a lower rear discharge-mouth, a curved bottom plate, L, pivoted to the hopper and adapted to reciprocate beneath the same to effect the discharge of the contents of the hopper, a guiding-box provided below the hopper and adapted to receive and guide the material discharged, a valve-plate pivoted to said box and adapted to regulate the area of the discharge-mouth of the hopper, and means for adjusting said valve-plate, substantially as specified.

14. The combination of the hopper having an open bottom and lower rear discharge-mouth, arms projecting from said hopper, a supporting and operating wheel carried between said arms, a curved plate arranged below and forming a movable bottom for said hopper, mechanism for operatively connecting the bottom plate to the wheel, an adjustable valve for regulating the area of the discharge-mouth, a box arranged below the hopper for receiving and guiding the material discharged, furrowing devices arranged in advance of said box, covering-blades, and a rear supporting-wheel carried by said box, substantially as specified.

In witness whereof I have hereunto set my hand this 3d day of July, A. D. 1896.

SAMUEL L. ALLEN.

Witnesses:
JNO. E. PARKER,
ELIAS H. WHITE.